(12) United States Patent
Oriol et al.

(10) Patent No.: US 9,837,943 B2
(45) Date of Patent: Dec. 5, 2017

(54) HARMONICS MITIGATION IN MULTIPHASE GENERATOR-CONVERSION SYSTEMS

(71) Applicant: Alstom Renewable Technologies, Grenoble (FR)

(72) Inventors: Gomis Bellmunt Oriol, Barcelona (ES); De Prada Gil Mikel, Castelldefels (ES); Diaz Gonzalez Francisco, Sant Boi de Lobregat (ES); Prieto Araujo Edardo, Premia de Mar (ES)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 8 days.

(21) Appl. No.: 15/103,882

(22) PCT Filed: Dec. 12, 2014

(86) PCT No.: PCT/EP2014/077516
§ 371 (c)(1),
(2) Date: Jun. 13, 2016

(87) PCT Pub. No.: WO2015/086800
PCT Pub. Date: Jun. 18, 2015

(65) Prior Publication Data
US 2016/0322924 A1    Nov. 3, 2016

(30) Foreign Application Priority Data

Dec. 13, 2013 (EP) .................................. 13382510

(51) Int. Cl.
*F03D 9/00* (2016.01)
*H02P 9/04* (2006.01)
(Continued)

(52) U.S. Cl.
CPC .................. *H02P 9/40* (2013.01); *H02P 9/02* (2013.01); *H02P 9/105* (2013.01); *H02P 9/30* (2013.01);
(Continued)

(58) Field of Classification Search
USPC ........................... 290/44, 55; 363/16, 26, 84
See application file for complete search history.

(56) References Cited

U.S. PATENT DOCUMENTS 6,493,242 B1 * 12/2002 Riggio .................... H02M 1/14
363/131
6,507,501 B2 * 1/2003 Riggio ..................... H01F 3/10
363/131
(Continued)

FOREIGN PATENT DOCUMENTS

EP        2479882 A2    7/2012

OTHER PUBLICATIONS

International Search Report and Written Opinion issed in connection with corresponding PCT application PCT/EP2014/077516 dated Mar. 4, 2015.

*Primary Examiner* — Pedro J Cuevas
(74) *Attorney, Agent, or Firm* — Douglas D. Zhang; GE Global Patent Operation (57) ABSTRACT

Multiphase generator-conversion systems are disclosed. The system includes a multiphase generator having one rotor and m+1 number of electromagnetically coupled stators, each stator having a plurality of phase legs. The system includes a converter having m+1 conversion lines, each conversion line connected to the plurality of phase legs of one of the m+1 stators. Each conversion line has a rectification module. At most m of the m+1 rectification modules has an active filtering converter. At least one of the m+1 rectification modules has a passive rectifier. At least one of the active filtering converters is configured to directly control its current to vary the magnetic flux of the stator to which it is connected and indirectly affect the magnetic flux of the rest of the stators through the electromagnetic coupling. Also disclosed are wind turbines that include generation conver- (Continued)

sion systems and methods of mitigating harmonics in multi-phase generator-conversion systems.

14 Claims, 8 Drawing Sheets

(51) Int. Cl.
    *H02P 9/40*     (2006.01)
    *H02P 9/10*     (2006.01)
    *H02P 9/30*     (2006.01)
    *H02P 21/24*     (2016.01)
    *H02P 9/02*     (2006.01)
    *H02M 3/335*     (2006.01)
    *H02M 5/42*     (2006.01)
    *H02P 101/15*     (2016.01)

(52) U.S. Cl.
    CPC .......... *H02P 21/24* (2016.02); *H02P 2101/15* (2015.01)

(56) References Cited

U.S. PATENT DOCUMENTS

| | | | | |
|---|---|---|---|---|
| 6,952,355 B2* | 10/2005 | Riggio | ................ | H02M 1/4225 363/21.15 |
| 8,363,439 B2* | 1/2013 | Yang | ................... | H02M 1/4258 363/89 |
| 8,378,608 B2* | 2/2013 | Robertson | ........... | H02M 5/4505 318/438 |
| 9,124,134 B2* | 9/2015 | Gomis Bellmunt | ...... | H02J 3/24 |
| 9,628,016 B2* | 4/2017 | Lamascus | ............... | H02P 27/04 |
| 2002/0181250 A1* | 12/2002 | Riggio | ...................... | H01F 3/10 363/16 |
| 2003/0002303 A1* | 1/2003 | Riggio | ................... | H02M 1/14 363/44 |
| 2004/0012986 A1* | 1/2004 | Riggio | ................ | H02M 1/4225 363/26 |
| 2006/0187684 A1* | 8/2006 | Chandrasekaran | ........................ | H02M 3/33592 363/16 |
| 2009/0262562 A1* | 10/2009 | Yang | ................... | H02M 1/4258 363/84 |
| 2010/0076612 A1* | 3/2010 | Robertson | ........... | H02M 5/4505 700/286 |
| 2010/0133816 A1 | 6/2010 | Abolhassani | | |
| 2014/0098571 A1* | 4/2014 | Gaknoki | ............. | H02M 1/40 363/16 |
| 2015/0042093 A1* | 2/2015 | Gomis Bellmunt | ...... | H02J 3/24 290/44 |
| 2015/0097504 A1* | 4/2015 | Lamascus | ............... | H02P 27/04 318/490 |

* cited by examiner

HARMONICS MITIGATION IN MULTIPHASE GENERATOR-CONVERSION SYSTEMS

BACKGROUND

The present disclosure relates to multiphase generators and more specifically to multiphase generator-conversion systems and methods of mitigating harmonics in such systems.

Wind turbines have to comply with certain standards regarding the quality of the power they generate. These standards are typically adopted by the electrical network operators in their respective grid codes, in which they determine the technical requirements for wind facilities for their grid integration. According to some grid codes, the power quality evaluation includes, among other aspects, the evaluation of the harmonic components in current and voltage waveforms at the connection point of the wind facility with the electrical network. Harmonic components may be provoked by generator imperfections or may be generated by the converters at the conversion lines. The study of harmonics on the generator side is relevant for wind turbine facilities because, among other aspects, harmonic currents flowing through the windings of the generators may provoke mechanical vibrations, which can diminish the life of their mechanical parts. Furthermore, they can increase the electrical power losses affecting the efficiency of the machine. Moreover, from the point of view of the management and control of the wind turbine, they can provoke measurement errors and interferences in communication systems.

The harmonic emission in wind turbines can be affected, among others, by the following aspects: i) the use of electronic power devices; and ii) the electromechanical design of the generators. Typically, the desired voltage waveforms at the stator terminals of the generators, and also at the grid connection point of variable speed wind turbines, are obtained by the switching of electronic power converters. However, the obtained waveforms are not purely sinusoidal but contain harmonic components. Regarding the electromechanical design of the generator, it is worth highlighting that the design of the windings, the stator and the rotor of the generator may affect the magnetic flux within the generator and thus the circulation of harmonic currents through it, and from it to the power converters which connect the system with the external grid.

The problem of the harmonic emission is more pronounced in DC wind turbine power plants. DC wind turbine power plants are wind turbine power plants with a DC collection grid, instead of a conventional AC collection grid. In order to implement DC wind power plants using conventional multiphase AC wind turbine generators, the output of the wind turbines power conversion systems must be in DC. To do that, the extensive use of power conversion systems based on electronic power converters is required. Power converters typically affect both the harmonic emission from the wind turbine to the DC collection grid of the DC wind power plant, as well as the harmonic currents flowing through the electrical generator of the wind turbines.

The present disclosure relates to various methods and devices for avoiding or at least partly reducing this problem.

BRIEF DESCRIPTION

In a first aspect, a multiphase generator-conversion system is disclosed. The multiphase generator-conversion system includes a multiphase generator having one rotor and m+1 number of electromagnetically coupled stators, m+1 being a natural number. Each stator has a plurality of phase legs. The multiphase generator-conversion system also has a converter having m+1 conversion lines. Each conversion line is connected to the plurality of phase legs of one of the m+1 stators. Each conversion line has a rectification module. At most m of the m+1 rectification modules have an active filtering converter, respectively. At least one of the m+1 rectification modules includes a passive rectifier, such as a diode rectifier. At least one of the active filtering converters is arranged to directly control its current to vary or affect the magnetic flux of the stator to which it is connected and to indirectly modify or affect the magnetic flux of the rest of the stators through the electromagnetic coupling between them to mitigate the harmonic content. This way, mitigation of the harmonic content both of the stator to which it is connected and also of the other machine stators is achieved.

In some implementations the m+1 stators may be in phase with each other. Therefore, each phase line of each stator may be in phase with a corresponding phase of the other stators. For example, in a 3-stator, and 3-phase/stator configuration, all stators may carry 3 phases 120° apart (e.g. at 0°, 120°, 240°. In other implementations, the m+1 stators may be completely out of phase meaning that no single phase line may carry the same phase as another phase line of another stator. For example, in a 3-stator, and 3-phase/stator configuration, each stator may carry 3 phases 120° apart, but, e.g., the first stator may have 3 phases at 0°, 120°, 240°, the second stator at 40°, 160°, 280° and the third Stator at 80°, 200°, 320°.

To explain how control on a current flowing through one of the stators, and consequently direct variation of its magnetic flux, may indirectly affect or cause variation of the magnetic flux of the other stators, the electromagnetic coupling principles of multiphase generators shall be firstly explained below with an example of a multiphase generator having three-phase stators. However, the principle explained below is not limited to three-phase stators and may be applied to any type of multiphase stators and any generator having any number of multiphase stators. For the purposes of this disclosure the terms "phase leg" and "winding" may be used indiscriminately and denote a coil carrying one phase of a stator.

The voltage equation of a generic electrical machine can be expressed as $$v_s = r_s i_s + \frac{d\lambda_s}{dt}, \quad (Eq.\ 1)$$

wherein, $v_s$ is the voltage vector of the generator at the connection point of the generator to the conversion system. It has a number of rows equal to the number of phases of the generator. $i_s$ is the current vector of the generator. It has a number of rows equal to the number of phases of the generator. $r_s$ is the total resistance circuit, and $\lambda_s$ is the flux linked at the stator coils.

Applying Eq. 1 to a generic permanent magnet rotor with multiple (i) three phase stators, the system can be expressed as:

$$v_s = r_s I_{n,n} i_s + L_s \frac{di_s}{dt} + \lambda_m \omega_e \begin{pmatrix} \cos(\theta_e) \\ \cos\left(\theta_e - \frac{2\pi}{3}\right) \\ \cos\left(\theta_e + \frac{2\pi}{3}\right) \\ \vdots \\ \cos\left(\theta_e + \frac{2\pi}{3} - \phi\right) \end{pmatrix} \quad (Eq.\ 2)$$

wherein, n is the number of machine phases (n=3*i), $I_{n,n}$ is the identity matrix, $L_s$ is the inductance matrix, $\lambda_m$ is the magnet flux linked by the stator coils, we is the electrical angular speed, $\theta_e$ is the angular speed, and $\phi$ is the electrical angle that the $i^{th}$ stator spans with respect to the first.

The $L_s$ inductance matrix (Eq. 3) is the equation which represents the magnetic coupling between all the generator phases.

$$L_s = \begin{pmatrix} L_{1,1} & M_{1,2} & M_{1,3} & & M_{1,(n-2)} & M_{1,(n-1)} & M_{1,n} \\ M_{2,1} & L_{2,2} & M_{2,3} & \cdots & M_{2,(n-2)} & M_{2,(n-1)} & M_{2,n} \\ M_{3,1} & M_{3,2} & L_{3,3} & & M_{3,(n-2)} & M_{3,(n-1)} & M_{3,n} \\ \vdots & & & \ddots & & & \vdots \\ M_{(n-2),1} & M_{(n-2),2} & M_{(n-2),3} & & M_{(n-2),(n-2)} & M_{(n-2),(n-1)} & M_{(n-2),n} \\ M_{(n-1),1} & M_{(n-1),2} & M_{(n-1),3} & \cdots & M_{(n-1),(n-2)} & M_{(n-1),(n-1)} & M_{(n-1),n} \\ M_{n,1} & M_{n,2} & M_{n,3} & & M_{n,(n-2)} & M_{n,(n-1)} & M_{n,n} \end{pmatrix} \quad \text{Eq. 3}$$

wherein, $L_{n,n}$ terms represent the self-inductances of each phase and $M_{m,n}$ the mutual inductances between the different phases.

From the previous matrix of Eq. 3, it can be seen that all the generator phases are coupled, even those belonging to different stators. Of course, the magnitude of the coupling may depend on the type of windings of the machine. For example, machines with distributed windings may show different coupling between phases of different stators, than concentrated winding machines. Also, there are certain winding configurations that reduce the coupling between the phases.

Now, assuming the electromagnetic coupling in the machine is present, it may be used with different purposes. Considering the configuration of FIG. 1, a multiphase generator 110 is shown with i three-phase stators connected to diode rectifiers 122-1 to 122-i, respectively.

Figure 1:
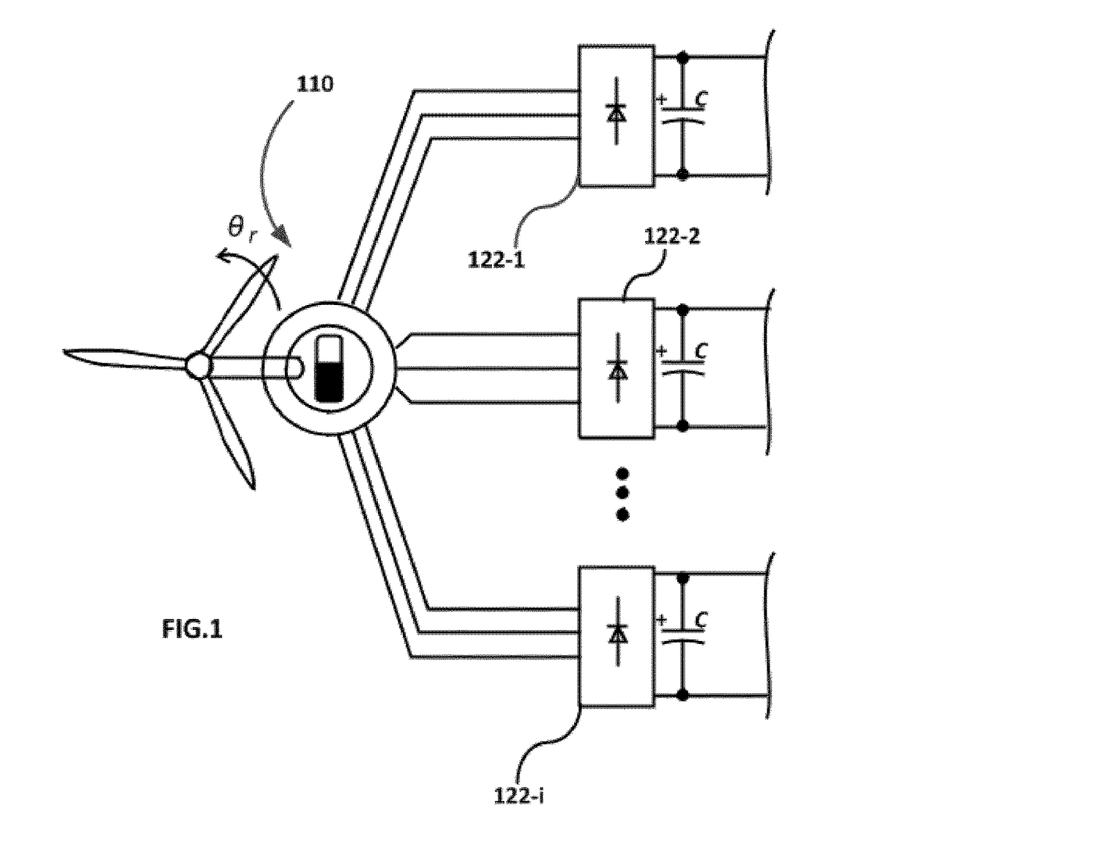
FIG. 1 illustrates a multiphase wind turbine generator with i three-phase stators connected to diode rectifiers.

The AC currents of this machine are rectified and injected to three different DC bus voltages (which may or may not be connected to the same DC bus). Due to the machine space harmonics and the current rectification using diode rectifiers, the currents may be polluted with several orders of harmonics.

Figure 2:
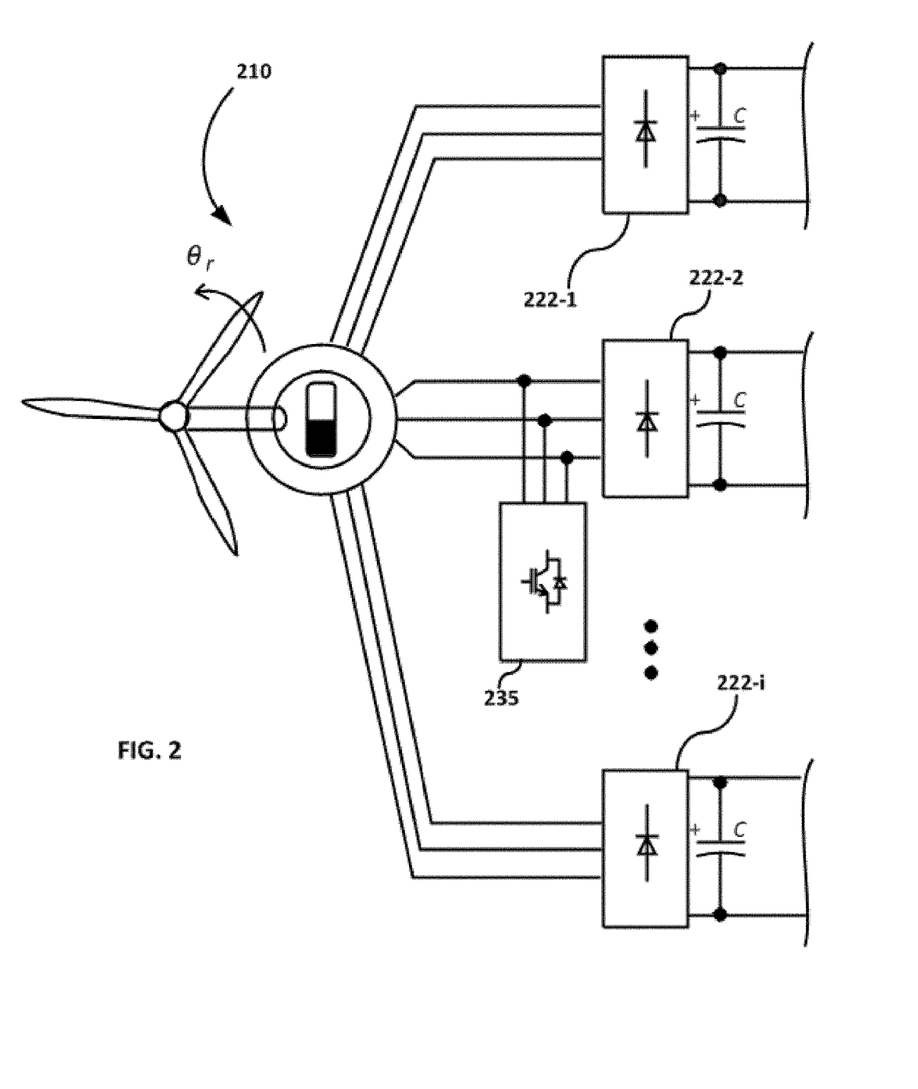
FIG. 2 illustrates a multiphase wind turbine generator with i three-phase stators connected to diode rectifiers having an active filtering converter connected in parallel with the generator stators.

These current harmonics are not producing any torque, thus the system should eliminate them. Then, taking advantage of the electromagnetic coupling between the machine's stators, these harmonics may be compensated connecting an active filtering converter. In one example the active filtering converter may be connected in parallel with the AC machine stators, as it is shown in FIG. 2. Generator 210 is similarly shown with i three-phase stators connected to diode rectifiers 222-1 to 222-i, respectively. An active filtering converter 235 is connected at the input of diode rectifier 222-2 in a shunt configuration. However, this configuration is merely an example and it is referred here to explain the principle of the invention.

Figure 3:
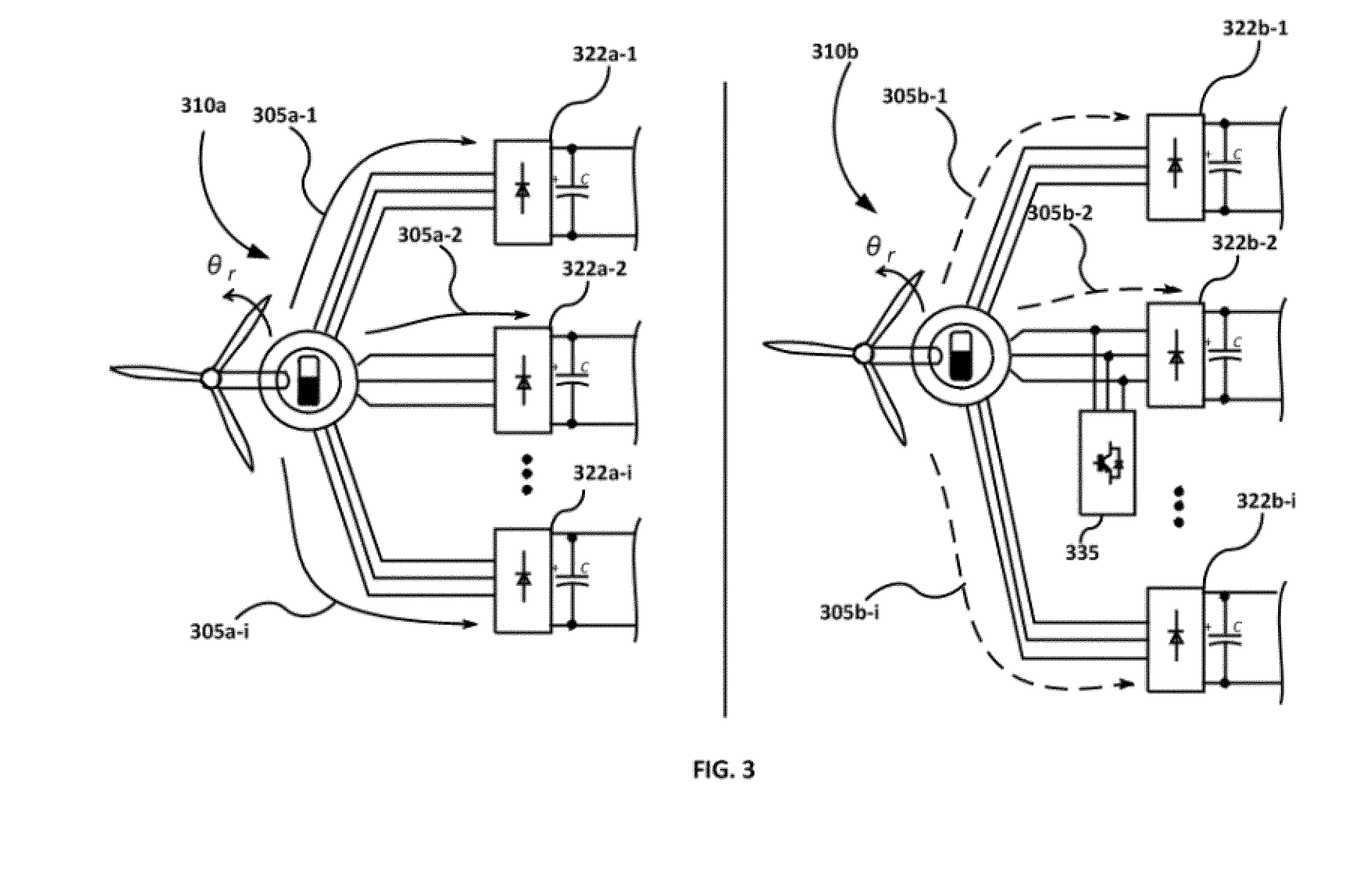
FIG. 3 illustrates a conceptual diagram of the multiple three-phase generator with diode rectifier converters with and without active filtering.

This active filtering converter will regulate its own current to reduce the amount of harmonic current flowing within both the machine stator to which it is connected and also of the other stators due to the electromagnetic coupling between the stators. FIG. 3 shows a conceptual diagram of the multiple three-phase stator generators with diode rectifier converter with and without active filtering. Left picture shows generator 310a connected to diode rectifiers 322a-1 to 322a-i and does not include any active filtering stage.

Therefore the currents, indicated with black lines 305a-1 to 305a-i, flowing through the circuit may be polluted. However, as it is shown in the right picture, when an active filtering converter 335 is connected to one of the stators of the multiphase machine 310b and in parallel with one of the diode rectifiers 322b-1 to 322b-i, then this converter, by regulating properly its own current, it is able to reduce the harmonic content not only of the stator where it is connected, but also of the others due to the magnetic coupling of the generator. Lines 305b-1 to 305b-i indicate the absence or mitigation of such harmonics.

Figure 4:
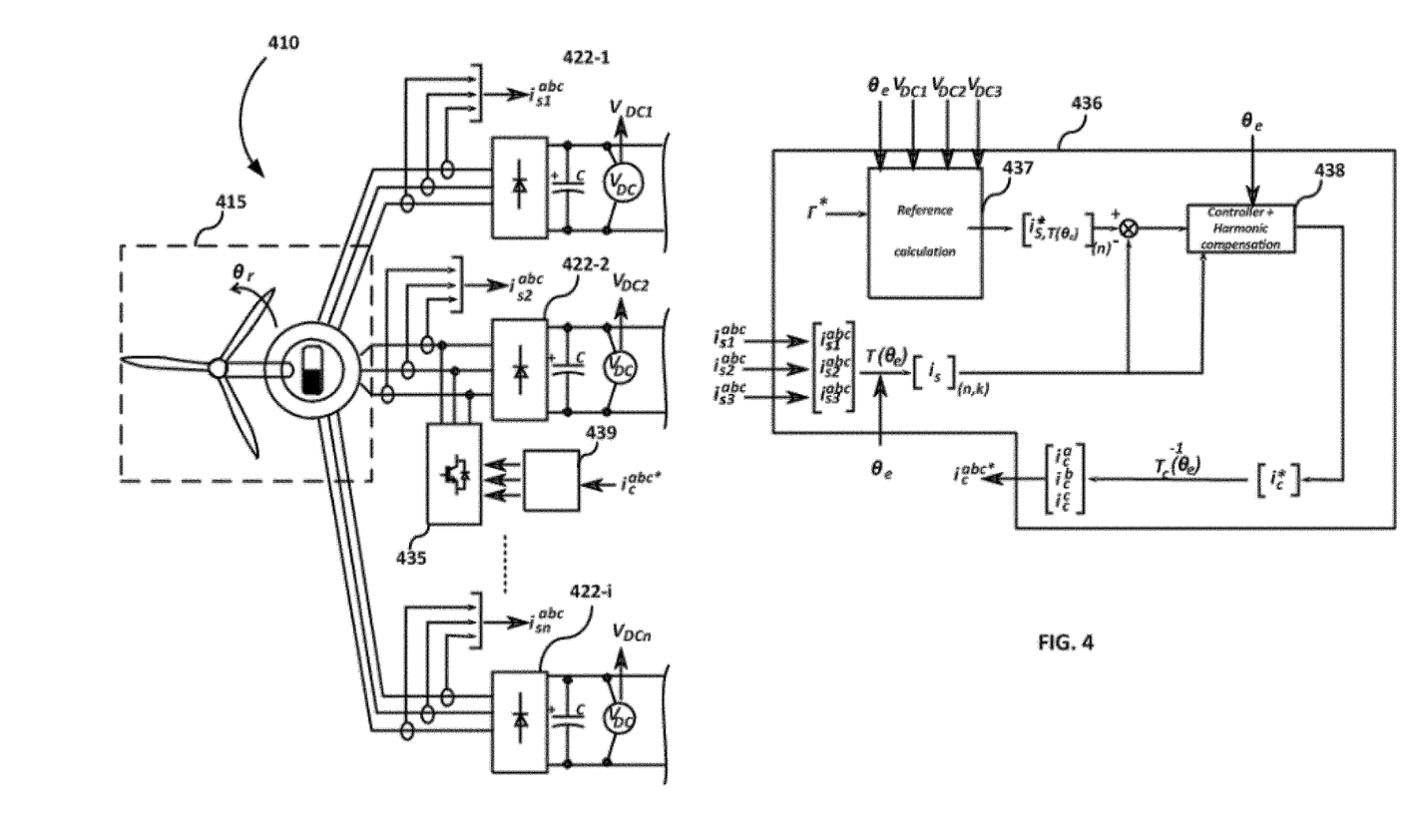
FIG. 4 illustrates a conceptual description of the controller of a multiple three-phase generator with harmonic mitigation.

The conceptual description of the controller 436 of a harmonic compensation system is illustrated in FIG. 4. A generator-conversion system 410 includes generator 415 connected to diode rectifiers 422-1 to 422-i. An active filtering converter 435 is connected at the input of diode rectifier 422-2 in a shunt configuration. All the currents $i_{s1}^{abc}$ to $i_{si}^{abc}$ of the AC systems are measured.

They are introduced into controller 436. Controller 436 may form part of active filtering converter 435 or it may be external to active filtering converter 435. Furthermore, it may control one or more active filtering converters.

Controller 436 calculates a current vector $i_{s,T(\theta e)}$ for the n phases. This vector results from the application of the transformation $T(\theta e)$ to the measured current vector $i_{si}^{abc}$ containing the instantaneous current measurements of the phases of the generator. In parallel, the reference torque $\Gamma^*$, the voltages $V_{DC1}$ to $V_{DCi}$ and the electrical machine angle $\theta e$ are introduced in Reference Calculation module 437 to generate the current vector reference $i^*_{s,T(\theta e)}$ for the controller. The $i_{s,T(\theta e)}$ and $i^*_{s,T(\theta e)}$ vector corresponding components are compared at an adding module and the result is introduced in the Controller and Harmonic compensation block 438. Controller & Harmonic compensation block 438 further receives the electrical machine angle $\theta e$ value to generate a filtering current vector $i^*_c$. The current reference vector $i^*_c$ is then used to generate the individual current references $i_c^{abc}$* through the transformation $T_c^{-1}(\theta e)$ to be introduced in the current control module 439 that is in charge of regulating the current flowing through the active filter 435 circuit, connected at the input of diode rectifier 422-2, to the defined reference values $i_c^{abc}$*. Thus, knowing the harmonic content of the machine currents and the coupling existing between the different stators, the active filtering converter is able to control a current (denoted as $i_c^{abc}$*.) to reduce the harmonic content flowing through the machine circuits.

In some embodiments each active filtering converter may be arranged to receive the values of the currents of the phase legs of all stators and calculate a current that reduces the amount of harmonic content from all stators when applied to the stator to which it is connected. The active filtering converter would, thus, include a controller such as controller 436 described with reference to FIG. 4. In case one active filtering converter is used, the currents may be received by one controlling module that calculates the mentioned current. In case there are more than one active filtering converters, then either each may contain a controlling module or share a common controlling module arranged with one active filtering converter for calculating the required currents of each active filtering converter.

In some embodiments each rectification module may include a diode rectifier and each rectifier may be connected to one of the m+1 stators and the active filtering converters may each be connected to the conversion line between one of the m+1 stators and its respective diode rectifier in a shunt configuration. In this case, the active filtering converter may simply be added for reducing the harmonic emission, but it may not be in charge of the power extraction from one of the stators of the generator. Consequently, its size may be reduced in comparison with the size of the active filtering converter of the previous embodiments. Moreover, in case the active filtering converter gets broken, the power extraction from the stator of the wind turbine to the diode rectifier that it is connected to may not be compromised.

In some embodiments each of the m+1 conversion lines may include either one of the active filtering converters or the at least one diode rectifier and each of the active filtering converters or diode rectifiers may be connected to a different one of the m+1 stators. Therefore, the active filtering converters may also act as rectifiers for their respective stators of the multiphase generator. The active filtering converters may rectify the AC output of one of the stators of the AC multiphase generator. The effective replacement of a diode rectifier by a controlled active filtering converter may enable a more precise control of the currents flowing through one of the stators of the generator.

In some embodiments each rectification module may include a diode rectifier and each diode rectifier may be connected to one of the m+1 stators and the converter may also have at least one active filtering converter. A switching circuit may be arranged between the at least one active filtering converter and a plurality of the m+1 stators. The switching circuit may be arranged to selectively connect the at least one active filtering converter to the conversion line between one of the plurality of m+1 stators and its respective diode rectifier, in a shunt configuration. Therefore, at any given moment in time only one of the rectification modules connected to the plurality of the m+1 stators may include the at least one active filtering converter and the respective diode rectifier. In an embodiment, thereby, it may be possible to select the particular stator that the active filtering converter is connected to. For instance, in case one of the stators of the generator becomes unavailable, the active filtering converter may be connected to another stator and keep providing the harmonic emission mitigation service.

In one embodiment, the switching circuit may include a plurality of branched lines. Each branched line may correspond to one of the phase legs of the plurality of m+1 stators and may be connected at the root to one of the at least one active filtering converters. Each branched line may have at most m+1 number of branches. The switching circuit may also have at most m+1 switches each receiving one branch of each of the plurality of branched lines. Each switch may be arranged between the active filtering converter and one of the plurality of m+1 stators. Thereby, in one aspect, each branched line may be used to also measure the currents of the phase lines.

In some embodiments the multiphase generator may be a permanent magnet generator.

In some embodiments the multiphase generator may be a nine-phase generator and m equals 2. Therefore, there are 3 stators and each stator may have 3 phase legs or windings.

In some embodiments the rectification module may include exactly one active filtering converter. This configuration may minimize the use of active filtering components thus reducing the cost of the generator-conversion system. The number of active filtering converters required for mitigating the harmonic content within a generator may depend on the active filtering converter sizing and the current limitation of the phase leg or winding cables and the generator design.

In some embodiments the active filtering converter may be a voltage source converter (VSC).

In some embodiments each conversion line may further include a dc/ac inverter, a transformer and an output diode rectifier. The dc/ac inverter may be connected to an output of the respective rectification module of the conversion line. The transformer may be connected to an output of the respective dc/ac inverter. The output diode rectifier may be connected to an output of the respective transformer. Thus, a full DC power plant may be manufactured with minimum harmonic components.

In some embodiments each phase leg may include a single winding.

However, in other embodiments each phase leg may include a plurality of windings assuming the windings of each phase leg are in-phase.

In another aspect, a wind turbine system is disclosed. The wind turbine system may include a multiphase generator conversion system according to the previous aspects described herein.

In yet another aspect, a method of mitigating harmonics in a multi-phase generator-conversion system is disclosed. The generator-conversion system may be substantially as the one described in previous aspects herein. The method includes the steps of measuring the currents of the phase legs of the m+1 stators of the multi-phase generator, identifying a plurality of harmonic contents present in the phases of the m+1 stators of the multi-phase generator, calculating a current based on the current values and applying the calculated current by the corresponding active filter of the stator where the active filter is connected to directly control its current to vary the magnetic flux of the stator and indirectly affect the magnetic flux of the rest of the stators through the electromagnetic coupling between them, to mitigate the harmonic content. This allows, ideally, mitigation of the identified harmonic contents both of the stator(s) to which the active filter(s) is(are) connected and also of the rest of the stators by taking advantage of the magnetic coupling between stators, which allows indirectly controlling the magnetic flux flowing through the stators not directly connected to an active filtering.

BRIEF DESCRIPTION OF THE DRAWINGS

Particular embodiments of the present invention will be described in the following by way of non-limiting examples, with reference to the appended drawings, in which.

DETAILED DESCRIPTION

Figure 5:
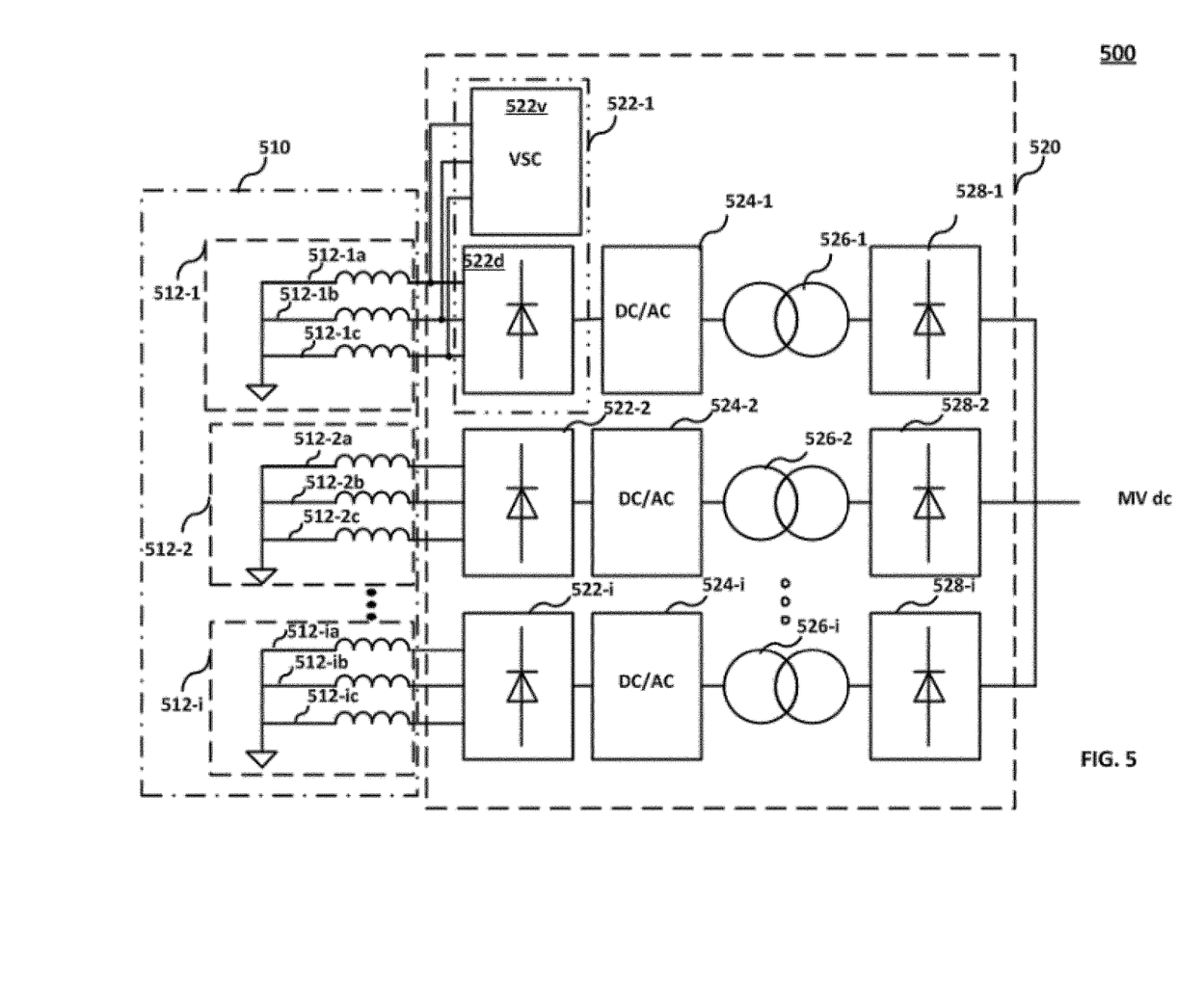
FIG. 5 illustrates a generator-conversion system according to an example.

FIG. 5 illustrates a generator-conversion system according to an example. Multiphase generator conversion system 500 includes a multiphase generator 510 and a conversion system 520. Multiphase generator 510 has i number of stators (512-1, 512-2, 512-$i$). Each stator includes 3 phase legs [(512-1$a$, 512-1$b$, and 512-1$c$), (512-2$a$, 512-2$b$, and 512-2$c$), (512-$ia$, 512-$ib$, and 512-$ic$)]. Each phase leg may correspond to a winding of the stator and carry a single distinct phase. In the example discussed with reference to FIG. 5 the generator 510 carries 3xi phases. However, in other implementations some or all corresponding phase legs of different stators may be in phase. Therefore, in examples according to embodiments of the present invention, the overall number of phases may be anywhere between 3 and 3xi. The phase legs of each stator are connected to a rectification module of a conversion line of the conversion system 520. Each conversion line includes a rectification module, a dc/ac converter, a Low Voltage/Medium Voltage transformer and a diode rectifier. The three phase legs of the first stator 512-1 are connected to a rectification module 522-1 of the conversion system 520. Accordingly, the three phase legs of the other stators (512-2 to 512-($i$–1)) are connected to rectification modules (522-2 to 522-($i$–1)).

In the generator conversion system 500 of FIG. 5, the rectification module 522-1 has an active filtering component 522$v$ and a diode rectifier 522$d$ in a shunt configuration. Stator 512-1 of Generator 510 has 3 phase legs 512-1$a$ to 512-1$c$. Rectification module 522-1 has VSC 522$v$ and diode rectifier 522$d$ connected in parallel to the phase legs of stator 512-1. The VSC of FIG. 5 receives all current measurements from all phase legs of generator 510. VSC 522$v$ calculates currents that may be regulated at the input of the diode rectifier 522$d$ of the 1st conversion line of conversion system 520. This current is calculated so as to mitigate the harmonic emissions of all conversion lines. The VSC 522$v$ is not in charge of the power extraction from one of the stators of the generator, as the rectification function is performed by the diode rectifier 522$d$. Instead, the VSC 522$v$ is in charge of quickly exchanging currents with the conversion line of the stator in which it is connected so as to reduce the harmonic components. Since the VSC 522$v$ is not in charge of any rectification function its size may be limited. Moreover, its function is simply to reduce the harmonic emissions. Therefore, in case the VSC does not work properly, the power extraction from the stator of the wind turbine to the diode rectifier that it is connected to may not be compromised.

Figure 6:
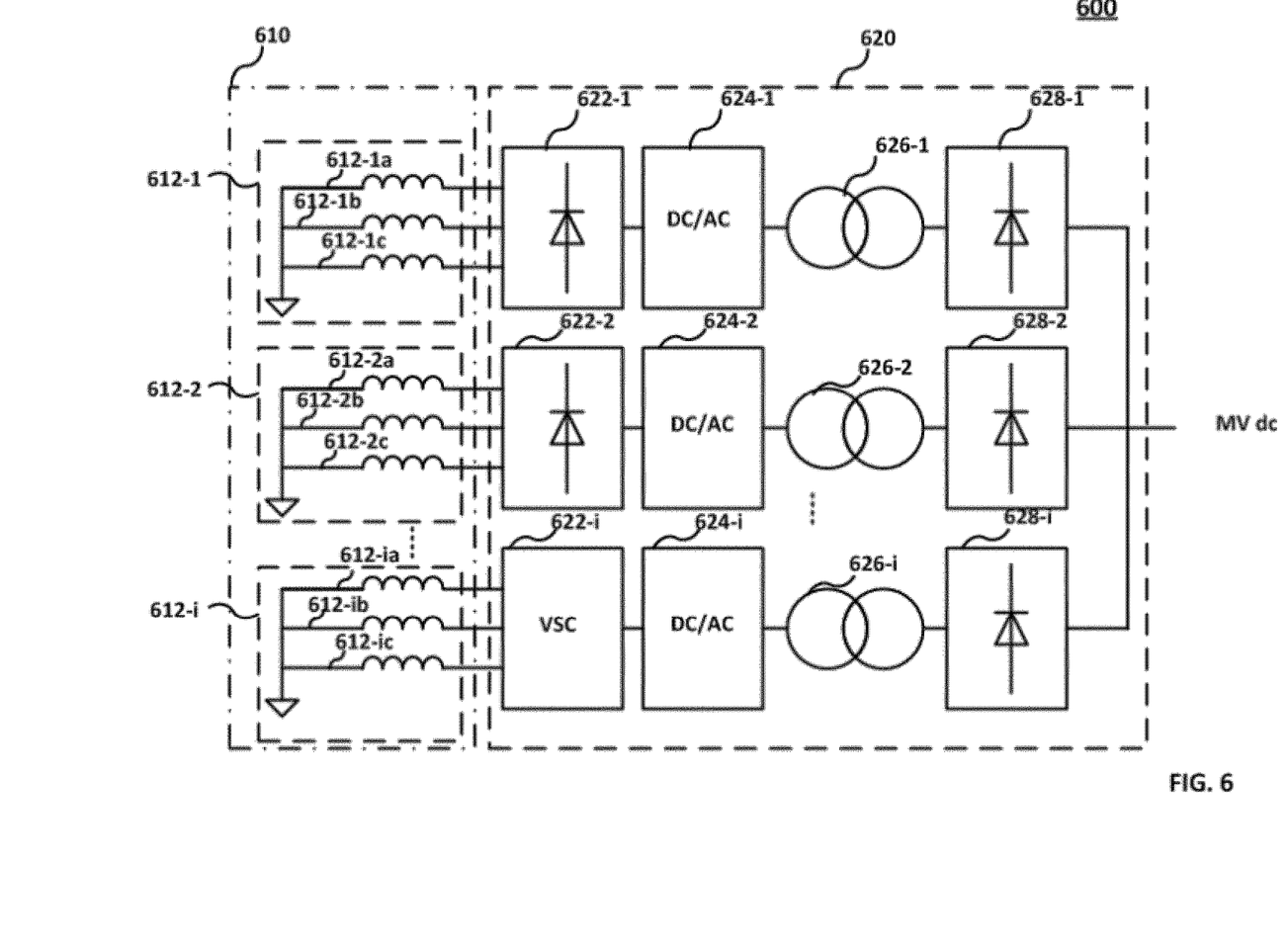
FIG. 6 illustrates a generator-conversion system according to another example.

Another example of a multiphase generator conversion system is described in FIG. 6. Multiphase generator conversion system 600 includes a multiphase generator 610 and a conversion system 620. Multiphase generator 610 has i number of stators (612-1, 612-2, 612-$i$). Each stator includes 3 phase legs [(612-1$a$, 612-1$b$, 612-1$c$), (612-2$a$, 612-2$b$, 612-2$c$), (612-$ia$, 612-$ib$, 612-$ic$)]. Each phase leg may correspond to a winding of the stator and carries a single distinct phase. Again, in the example discussed with reference to FIG. 6 the generator 610 carries 3xi phases. However, in other implementations some or all corresponding phase legs of different stators may be in phase. Therefore, in examples according to embodiments of the present invention, the overall number of phases may be anywhere between 3 and 3xi. The phase legs of each stator are connected to a rectification module of a conversion line of the conversion system 620. Each conversion line includes a rectification module, a dc/ac converter, a Low Voltage/Medium Voltage transformer and a diode rectifier. The three phase legs of the first stator 612-1 are connected to a diode rectifier 622-1 of the conversion system 620. Accordingly, the three phase legs of the other stators (612-2 to 612-($i$–1)), except the stator 612-$i$ are connected to diode rectifiers (622-2 to 622-($i$–1)). The phase legs of stator 612-$i$ are connected to active filtering converter 622-$i$. Active filtering converter 622-$i$ is depicted as a VSC. However any type of active filtering converter may be used in place. Each of the rectification modules 622-1 to 622-$i$ is connected to a dc/ac converter 624-1 to 624-$i$, respectively. Accordingly, each of the dc/ac converters 624-1 to 624-$i$ is connected to a LV/MV transformer 626-1 to 626-$i$, respectively. Finally, each of the LV/MV transformers 626-1 to 626-$i$ is connected to a diode rectifier 628-1 to 628-$i$, respectively. The DC outputs of the diode rectifiers 628-1 to 628-$i$ may be connected to the grid.

The VSC 622-$i$ includes a control unit (not shown) that receives current measurements from all the phase legs of all stators. It calculates a current reference, to reduce the machine harmonic content of the machine, to be regulated in its corresponding circuit considering not only the currents that are sensed directly by the VSC (the currents of phase legs 612-$ia$ to 612-$ic$) but also the currents of the other phase legs. Therefore, it has the ability to regulate the current flowing its stator e 622-$i$ to mitigate not only the harmonics emitted by the conversion line i, but also the harmonic emissions of all conversion lines. Although only one VSC is shown in FIG. 6, one skilled in the art may appreciate that more than one VSCs may be used as part of an embodiment of the present invention. It may be required to include another active filtering converter, or VSC, in a multi-phase generator, such as, e.g. a permanent magnet generator of a wind turbine, when the amount of current required overpasses the current limits of the windings cable. In this way, the required current to be injected to the windings to affect the flux of the permanent magnet generator may be divided between various active filtering converters, thus avoiding the requirement of oversize additional elements. The sizing of the active filtering converters may depend not only on the amount of current required to mitigate the harmonic content but also on the strength of the coupling field of the generator among stators. However, since the active filtering converter is used as a full power converter, its sizing may as well be determined by the nominal power of the stator to which it is connected, as the main function of the active filtering converter will be the rectification of the current of the stator.

Figure 7:
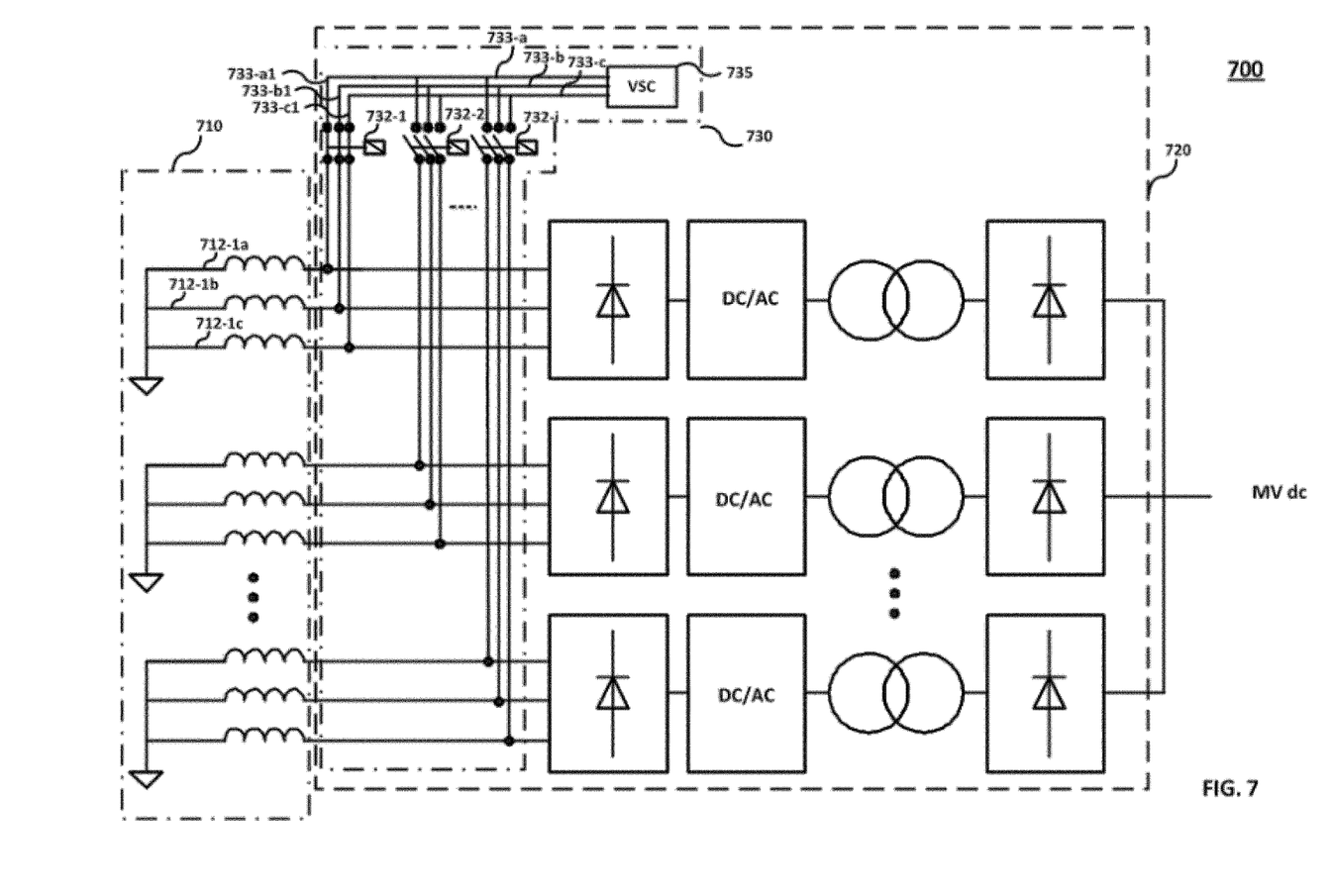
FIG. 7 illustrates a generator-conversion system according to yet another example.

FIG. 7 illustrates a generator-conversion system according to yet another example. Generator conversion system 700 includes generator 710, conversion system 720 and switching circuit 730. Generator 710 is similar to generators 510 and 610. Conversion system 720 has i conversion lines. Each conversion line has a diode rectifier, a DC/AC converter, a Low to Medium Voltage (LV/MV) transformer and another diode converter. The switching circuit includes a VSC 735, a plurality of switches 732-1 to 732-$i$ and 3 branched lines 733-$a$ to 733-$c$. Each branched line corresponds to one of the phase legs of the i stators and is connected at the root to the VSC. Each branched line has i number of branches. Each branch is connected to a single phase leg. Each switch receives a branch of each branched line. For example, switch 732-1 receives branches 733-$a$1, 733-$b$1 and 733-$c$1. These branches are each connected to one of the phase legs 712-1$a$ to 712-1$c$, respectively. When switch 732-1 is closed, then the generator-conversion system 700 functions exactly in the same way as the generator-conversion system 600. However, when switch 732-1 is closed all other switches need to be open. The VSC 735 cannot be connected to two different stators at the same time, since it may provoke a short-circuit to the system.

In practice, the VSC may be connected to the stator that is expected to emit the most harmonics. For example, it may connect to the stator where the measured currents are higher. However, not all the time the same stator may generate the highest currents. Therefore, the switching circuit may monitor the current intensity and switch the VSC 735 from stator to stator based on such measurements. Therefore, direct harmonic mitigation may take place at the more harmonic prone stator at any given time. Furthermore, if one stator becomes unavailable, e.g., due to malfunction of a phase leg or due to preventive maintenance of same or of its conversion line, then the harmonic mitigation may still be performed from another stator Other possible reasons for switching between stators may be differences in the windings of the stators, potential faults that may appear in different phases during the course of life of the generator, or potential differences in the each of the conversion lines due to divergences in the properties of the semiconductors or of the transformers.

Figure 8:
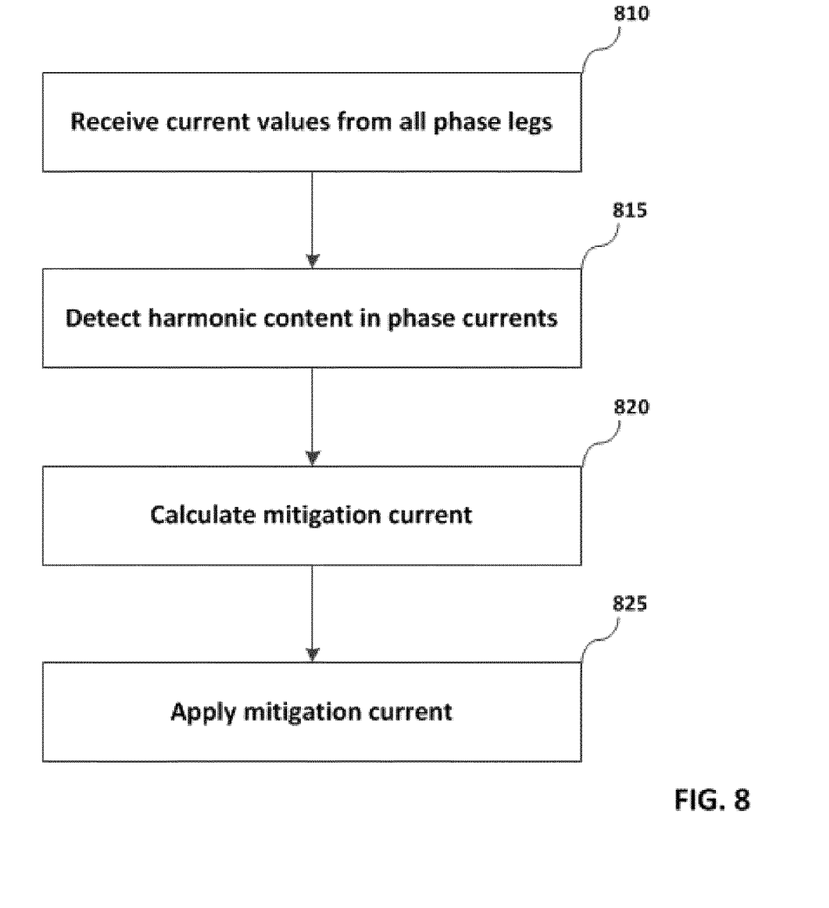
FIG. 8 illustrates a flow diagram of a method of mitigating harmonics.

FIG. 8 is a flow diagram of a method of mitigating harmonics in a multi-phase generator-conversion system. In a first step 810 the values of the currents of the phase legs of all stators are received. Then, in step 815 the harmonic content present in the phase currents of the m+1 stators of the multi-phase generator are identified. Subsequently, in step 820, a mitigation current based on the current values is calculated to be applied by the corresponding active filters to mitigate all identified harmonic contents of the stator where the active filter is connected and also of the other stators through the magnetic coupling.

Then, in step 825 the calculated current is applied by the corresponding active filter of the stator where the active filter is connected to directly control its current to vary the magnetic flux of the respective stator. Since the stators are electromagnetic coupled this same current indirectly affects or varies the magnetic flux of the rest of the stators. Thus, it is possible to mitigate the harmonic content from all stators.

Although only a number of particular embodiments and examples of the invention have been disclosed herein, it will be understood by those skilled in the art that other alternative embodiments and/or uses of the embodiments of the present invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

What is claimed is:

1. A multiphase generator-conversion system comprising:
   a multiphase generator having one rotor and m+1 number of electromagnetically coupled stators, each stator comprising a plurality of phase legs,
   a converter having m+1 conversion lines, each conversion line connected to the plurality of phase legs of one of the m+1 stators, each conversion line comprising a rectification module, wherein
   at most m of the m+1 rectification modules comprise respective active filtering converters, and at least one of the m+1 rectification modules comprises a passive rectifier,
   whereby at least one of the active filtering converters is configured to directly control its current to vary the magnetic flux of the stator to which it is connected and to indirectly affect the magnetic flux of the rest of the stators through the electromagnetic coupling between them, to mitigate the harmonic content.

2. The multiphase generator conversion system according to claim 1, wherein each active filtering converter is configured to receive the values of the currents of the phase legs of all stators and regulate its current to reduce the harmonic content from all stators when applied to the stator to which it is connected.

3. The multiphase generator conversion system according to claim 1, wherein each of the m+1 conversion lines comprises either one of the active filtering converter or the passive rectifier, the passive rectifier comprising at least one diode rectifier, each of the active filtering converters or diode rectifiers being connected to a different one of the m+1 stators.

4. The multiphase generator conversion system according to claim 1, wherein each rectification module comprises a diode rectifier, each connected to one of the m+1 stators, and wherein the active filtering converters are each connected to the conversion line between one of the m+1 stators and its respective diode rectifier, in a shunt configuration.

5. The multiphase generator conversion system according to claim 1, wherein each rectification module comprises a diode rectifier, each connected to one of the m+1 stators, and wherein the converter further comprises
   a switching circuit, arranged between at least one of the active filtering converters and a plurality of the m+1 stators, wherein the switching circuit is configured to selectively connect the at least one of the active filtering converters to the conversion line between one of the plurality of m+1 stators and its respective diode rectifier, in a shunt configuration, so that at any moment in time only one of the rectification modules connected to the plurality of the m+1 stators comprises the at least one of the active filtering converters and the respective diode rectifier.

6. The multiphase generator conversion system according to claim 5, wherein the switching circuit comprises
   a plurality of branched lines, each branched line corresponding to one of the phase legs of the plurality of m+1 stators and being connected at the root to one of the active filtering converters, wherein each branched line comprises at most m+1 number of branches,
   at most m+1 switches each receiving one branch of each of the plurality of branched lines, each switch being arranged between the active filtering converter of an associated one of the branched lines and one of the plurality of m+1 stators.

7. The multiphase generator conversion system according to claim 1, wherein the multiphase generator is a permanent magnet generator.

8. The multiphase generator conversion system according to claim 1, wherein the multiphase generator is a nine-phase generator and m equals 2.

9. The multiphase generator conversion system according to claim 1, wherein the rectification module comprises exactly one active filtering converter.

10. The multiphase generator conversion system according to claim 1, wherein the active filtering converter is a voltage source converter (VSC).

11. The multiphase generator conversion system according to claim 1, wherein each conversion line further comprises:
    a dc/ac inverter connected to an output of the respective rectification module of the conversion line,
    a transformer, connected to an output of the respective dc/ac inverter, and
    an output diode rectifier connected to an output of the respective transformer.

12. The multiphase generator conversion system according to claim 1, wherein each phase leg comprises a single winding.

13. A wind turbine system comprising a multiphase generator conversion system according to claim 1.

14. A method of mitigating harmonics in a multi-phase generator-conversion system according to claim 1, comprising:
- measuring the currents of the phase legs of the m+1 stators of the multi-phase generator;
- identifying a plurality of harmonic contents present in the phases of the m+1 stators of the multi-phase generator;
- calculating a mitigation current based on said current values;
- with the corresponding active filter, applying the calculated current to directly control its current to vary the magnetic flux of the stator where the active filter is connected and to indirectly affect the magnetic flux of the rest of the stators through the electromagnetic coupling between them, to mitigate the harmonic content.

* * * * *